US010352252B2

(12) United States Patent
Ninomiya et al.

(10) Patent No.: US 10,352,252 B2
(45) Date of Patent: Jul. 16, 2019

(54) AIR INTAKE DEVICE AND AIR INTAKE CONTROL VALVE

(71) Applicant: AISIN SEIKI KABUSHIKI KAISHA, Kariya-shi, Aichi-ken (JP)

(72) Inventors: Kyohei Ninomiya, Kariya (JP); Toshiyuki Oiwa, Handa (JP); Masato Ishii, Kariya (JP); Motonobu Hasegawa, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 137 days.

(21) Appl. No.: 15/254,637

(22) Filed: Sep. 1, 2016

(65) Prior Publication Data
US 2017/0067398 A1    Mar. 9, 2017

(30) Foreign Application Priority Data

Sep. 3, 2015    (JP) .................................. 2015-173496

(51) Int. Cl.
*F02D 9/16*      (2006.01)
*F02D 9/10*      (2006.01)
(Continued)

(52) U.S. Cl.
CPC ............ *F02D 9/16* (2013.01); *F02B 27/0263* (2013.01); *F02B 27/0273* (2013.01);
(Continued)

(58) Field of Classification Search
CPC . F02D 9/16; F02D 9/1095; F02D 9/10; F02B 27/0273; F02B 27/0263;
(Continued)

(56) References Cited

U.S. PATENT DOCUMENTS 4,907,547 A    3/1990    Daly
6,979,130 B1 *   12/2005    Stangier .................. F02B 27/02
                                                                               123/184.53
(Continued)

FOREIGN PATENT DOCUMENTS

CN             104343526 A      2/2015
DE       20 2006 019 638 U1    6/2008
(Continued)

OTHER PUBLICATIONS

European Search Report dated Jan. 31, 2017, by the European Patent Office, in corresponding European Patent Application No. 16186931.8 (6 pages).
(Continued)

*Primary Examiner* — Hung Q Nguyen
*Assistant Examiner* — Brian P Monahon
(74) *Attorney, Agent, or Firm* — Buchanan Ingersoll & Rooney PC

(57) ABSTRACT

An air intake device includes: a valve body which includes a rotating shaft; a bearing member which rotatably supports the rotating shaft of the valve body; and an air intake port which includes a concave portion on which the bearing member is disposed, wherein the bearing member includes a positioning portion for positioning the bearing member with respect to the concave portion of the air intake port, facing surfaces which extend from the positioning portion along the concave portion of the air intake port and face each other in an inward radial direction of the rotating shaft with respect to the concave portion, with a gap therebetween, and protruding portions which protrude toward the concave portion of the air intake port from the facing surfaces and seal the gap.

8 Claims, 6 Drawing Sheets

(51) Int. Cl.
  *F02B 31/06* (2006.01)
  *F02B 27/02* (2006.01)
  *F16K 1/22* (2006.01)
  *F16K 27/02* (2006.01)
  *F16K 27/00* (2006.01)
  *F02M 35/10* (2006.01)
  *F02M 35/112* (2006.01)

(52) U.S. Cl.
  CPC ............ *F02B 31/06* (2013.01); *F02D 9/10* (2013.01); *F02D 9/1095* (2013.01); *F02M 35/10065* (2013.01); *F16K 1/22* (2013.01); *F16K 1/224* (2013.01); *F16K 27/003* (2013.01); *F16K 27/02* (2013.01); *F02M 35/112* (2013.01); *Y02T 10/146* (2013.01)

(58) Field of Classification Search
  CPC . F02B 31/06; F16K 1/22; F16K 27/02; Y02T 10/146; F02M 35/112; F02M 35/10065
  See application file for complete search history.

(56) References Cited

U.S. PATENT DOCUMENTS

| | | | |
|---|---|---|---|
| 9,863,329 B2* | 1/2018 | Vaginet | F02D 9/16 |
| 2001/0019119 A1* | 9/2001 | Alves | F16K 1/22 |
| | | | 251/305 |
| 2005/0062008 A1* | 3/2005 | Makino | B29C 45/14 |
| | | | 251/306 |
| 2005/0189513 A1* | 9/2005 | Ino | F02B 27/02 |
| | | | 251/308 |
| 2007/0051913 A1* | 3/2007 | Torii | F02D 9/1025 |
| | | | 251/305 |
| 2010/0059009 A1 | 3/2010 | Goldin et al. | |
| 2015/0041013 A1* | 2/2015 | Oiwa | F16K 1/224 |
| | | | 137/862 |
| 2015/0047595 A1* | 2/2015 | Oiwa | F02M 35/1036 |
| | | | 123/184.55 |
| 2015/0211393 A1* | 7/2015 | Ishihara | F02B 31/06 |
| | | | 123/188.2 |
| 2015/0252733 A1* | 9/2015 | Oiwa | F02B 27/0263 |
| | | | 123/337 |
| 2015/0330340 A1* | 11/2015 | Oiwa | F02B 27/0215 |
| | | | 123/184.38 |

FOREIGN PATENT DOCUMENTS

| | | |
|---|---|---|
| EP | 2 835 525 A1 | 2/2015 |
| JP | 5065211 B2 | 10/2012 |
| JP | 2014-101800 A | 6/2014 |

OTHER PUBLICATIONS

Office Action (Notification of the 1st Office Action) dated Jul. 27, 2018, by the State Intellectual Property Office (SIPO) of the People's Republic of China in corresponding Chinese Patent Application No. 201610782150.1 and an English Translation of the Office Action. (15 pages).

Notification of Reasons for Refusal dated Apr. 12, 2019 in correpsonding Japanese Application No. 2015-173496 and English translation (8 pages).

* cited by examiner

STATE WHERE END PORTION BEARING MEMBER 60 IS ASSEMBLED TO END PORTION HOLDING PORTION 80

STATE WHERE END PORTION BEARING MEMBER 60 IS ASSEMBLED TO END PORTION HOLDING PORTION 80

AIR INTAKE DEVICE AND AIR INTAKE CONTROL VALVE

CROSS REFERENCE TO RELATED APPLICATIONS

This application is based on and claims priority under 35 U.S.C. § 119 to Japanese Patent Application 2015-173496, filed on Sep. 3, 2015, the entire contents of which are incorporated herein by reference.

TECHNICAL FIELD

This disclosure relates to an air intake device and an air intake control valve.

BACKGROUND DISCUSSION

Hitherto, an air intake device in which a valve body, bearing members which rotatably support a rotating shaft of the valve body, and air intake ports to which the bearing members are assembled are provided, or the like is known (For example, see Japanese Patent No. 5065211 (Reference 1)).

Reference 1 discloses a bearing device of a butterfly valve (a valve body) which is rotatably incorporated in a valve body (air intake ports) on which an air intake passage portion is formed in a variable air intake device of the engine. In the bearing device described in Reference 1, bearing members which are a separate component are fitted between a rotating shaft of the butterfly valve and a bearing portion (the bearing members) of the valve body side. In other words, the bearing members as a separate component are slidably interposed between the rotating shaft of the butterfly valve and the bearing portion of the valve body side. By applying this bearing structure, each movement (axial shift) of the butterfly valve with respect to the valve body (the bearing portion of the valve body) in a rotating shaft direction and in a radial direction is allowed. By an opening and closing operation of the butterfly valve, an air intake path is switched to a short port and a long port. Accordingly, the engine is closed in the low/mid-rotating region and the air intake path becomes the long port and thus an air intake inertia effect (an air intake pulsation effect) is obtained and an air intake efficiency is kept high.

However, in the bearing device of the air intake device described in Reference 1, since the bearing members as a separate component are interposed between the rotating shaft of the butterfly valve and the bearing portion of the valve body side, many gaps are generated in the bearing structure itself. Therefore, even if the butterfly valve is fully closed, air bypasses gap portions existing within the bearing structure and air is likely to leak from an upstream side to a downstream side of the air intake ports. Thus, since the air intake pulsation (the air intake inertia effect) cannot be efficiently obtained due to sealing properties of the air intake passage portion being lowered, there is a problem that engine performance is lowered.

SUMMARY

Thus, a need exists for an air intake device and an air intake control valve which are not suspectable to the drawback mentioned above.

An air intake device according to an aspect of this disclosure includes a valve body which includes a rotating shaft, a bearing member which rotatably supports the rotating shaft of the valve body, and an air intake port which includes concave portions on which the bearing member is disposed. The bearing members includes a positioning portion for positioning the bearing member with respect to the concave portion of the air intake port, facing surfaces which extend from the positioning portion along the concave portion of the air intake port and face each other in an inward radial direction of the rotating shaft with respect to the concave portion, with a gap therebetween, and protruding portions which protrude toward the concave portion of the air intake port from the facing surfaces and seal the gap.

An air intake control valve according to a second aspect of this disclosure includes a valve body which includes a rotating shaft, and a bearing member which rotatably supports the rotating shaft of the valve body. The bearing member includes a positioning portion for positioning the bearing member with respect to a concave portion of an air intake port, facing surfaces which extend from the positioning portion along the concave portion of the air intake port and face each other in an inward radial direction of the rotating shaft with respect to the concave portion, with a gap therebetween, and protruding portions which protrude toward the concave portion of the air intake port from the facing surfaces and seal the gap.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment disclosed here will be described based on the drawings.

Embodiment

With reference to FIG. 1 to FIG. 11, an air intake device 100 according to an embodiment disclosed here will be described.

Structure of Air Intake Device

Figure 1:
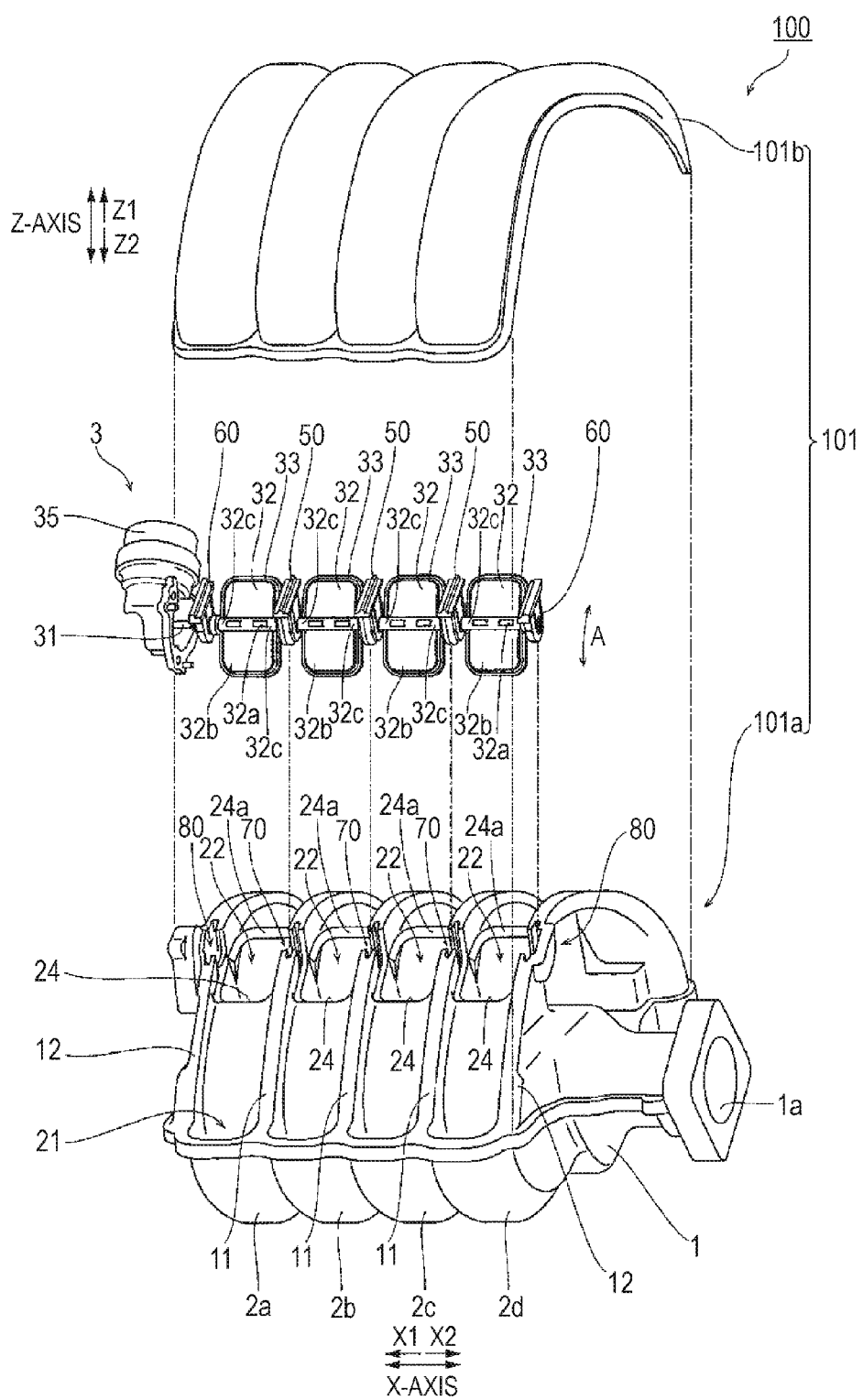
FIG. 1 is an exploded perspective view illustrating configuration of an air intake device according to an embodiment disclosed here.

The air intake device 100 is provided on an in-line four-cylinder engine for a vehicle (not illustrated), as illustrated in FIG. 1. The air intake device 100 includes a surge tank 1, four air intake ports 2a to 2d which are branched from the surge tank 1 and are disposed downstream of the surge tank 1, and an air intake control valve 3 which is provided on the inner portion of the air intake ports 2a to 2d. In addition, in the air intake device 100, an air intake device main body 101 is configured such that the surge tank 1 and the air intake ports 2a to 2d are integrated with each other.

In the air intake device main body 101, a main body portion 101a made from resin and a cover member 101b made from resin are joined to each other by vibration welding in a state where the air intake control valve 3 is mounted on the main body portion 101a. Accordingly, the air intake control valve 3 is operatively provided on the inner portion of the air intake device main body 101. In addition, the air intake device 100 is connected to a cylinder head 90 (see FIG. 2) and the air intake ports 2a to 2d are connected to each cylinder of an engine through the cylinder head 90, respectively.

In the surge tank 1, air intake is introduced from an inlet portion 1a. In addition, the air intake ports 2a to 2d which are branched from the surge tank 1 are disposed side by side in the X-axis direction in order to be adjacent to each other with an intermediate partition wall 11 interposed therebetween. An end portion partition wall 12 is formed on the side opposite to the intermediate partition wall 11 of the air intake port 2a (X1 side) and the air intake ports 2d (X2 side) in the outermost sides, respectively.

Figure 2:
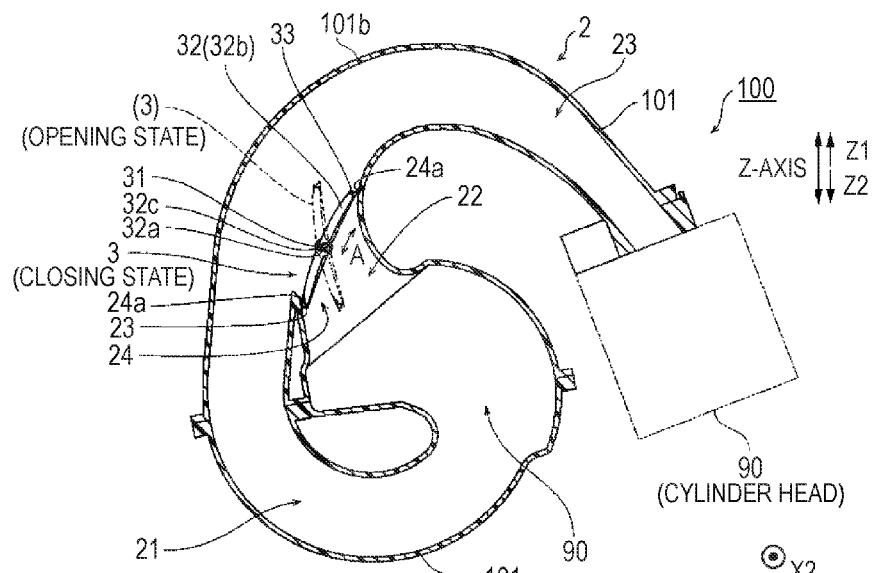
FIG. 2 is a schematic cross-sectional view taken along air intake ports of the air intake device according to the embodiment disclosed here.

In addition, as illustrated in FIG. 2, each of the air intake ports 2a to 2d includes a first port portion 21 having a relatively long length, a second port portion 22 having a relatively short length, and an outlet port portion 23 disposed on the downstream side of the first port portion 21 and of the second port portion 22. Here, the first port portion 21 upwardly (arrow Z1 direction) extends while turning the lower side (Z2 side) of the surge tank 1 and is connected to the corresponding outlet port portion 23. On the other hand, the second port portion 22 connects the surge tank 1 and the corresponding outlet port portion 23 through the air intake control valve 3.

The air intake control valve 3 has a function for opening and closing each opening portion 24 (four positions) which is located on a connecting portion between the second port portion 22 and the outlet port portion 23. In a state where the air intake control valve 3 is closed (illustrated by a solid line in FIG. 2), a long port having a long air intake path length is formed by the first port portion 21 and the outlet port portion 23. In addition, In a state where the air intake control valve 3 is opened (illustrated by a two-dot chain line in FIG. 2), a short port having a short air intake path length is formed by the second port portion 22 and the outlet port portion 23. Accordingly, the air intake path length of the air intake device main body 101 is changed along with the opening and closing of the opening portions 24 by the air intake control valve 3. In other words, the air intake control valve 3 has a function as a variable intake valve which changes the air intake path length to each cylinder of the engine. Accordingly, the air intake device 100 is configured to change the air intake path length according to the engine speed or the engine load and to supply an appropriate amount of air intake to each cylinder of the engine through the cylinder head 90.

Structure of Air Intake Control Valve

Figure 3:
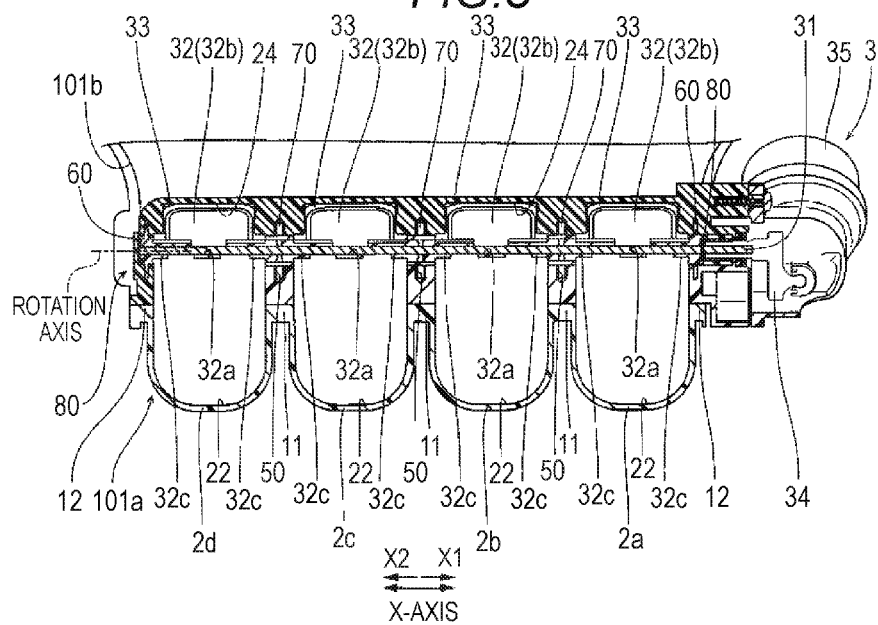
FIG. 3 is a cross-sectional view taken along a rotating shaft of an air intake control valve of the air intake device according to the embodiment disclosed here.

As illustrated in FIG. 3, the air intake control valve 3 includes a shaft 31 having a polygonal shape (a cross section thereof being a rectangular shape) made of metal which rotates a valve body 32, four valve bodies 32 which open and close the opening portions 24, an actuator 33 generates driving force by supply of negative pressure and rotates the shaft 31, and a link member 34 which transmits the driving force of the actuator 33 to the shaft 31.

The shaft 31 extends in an X-axis direction in which the air intake ports 2a to 2d are arranged in horizontal and passes through the four successive second port portions 22 (see FIG. 1). In addition, both ends of the shaft 31 are rotatably supported by end portion bearing members 60 which are respectively disposed on a pair of (two locations) end portion holding portion 80 of an end portion partition wall 12. In addition, at the same time, intermediate portions of the shaft 31 are rotatably supported by three intermediate bearing members 50 which are disposed on an intermediate holding portion 70 of the intermediate partition wall 11 in the three locations in the middle of the partition wall.

As illustrated in FIG. 1, the valve body 32 is a plate-like member with a rectangular shape and a wrap, which is made from resin (for example, 6,6-nylon) and has rounded shape in the four corners corresponding to the shapes of the inside surfaces of the opening portion 24. In addition, a shaft inserting portion 32a which extends from a center portion in a longitudinal direction (in the direction of the arrow A) in which a blade portion 32b extends, in the X-axis direction is provided in the valve body 32. The cross-section of the shaft inserting portion 32a is a rectangular shape and the valve body 32 is configured to integrally rotate with the shaft 31, by the outside surface of the shaft 31 inserted into the shaft inserting portion 32a being in contact with the inside surface of the shaft inserting portion 32a.

A rotating shaft portion 32c (an example of the rotating shaft) which is protruded from the blade portion 32b in the arrow X1 direction and in the arrow X2 direction and has a cylindrical shape is provided on the both ends of the shaft inserting portion 32a in the X-axis direction in the each of the valve bodies 32. The rotating shaft portion 32c is rotatably supported by the intermediate bearing members 50 and the end portion bearing members 60 disposed on the side of the valve body 32. Accordingly, the four valve bodies 32 are rotatably supported by the intermediate bearing members 50 and the end portion bearing members 60.

In addition, a seal member 33 made of rubber is provided on the peripheral portion of the valve body 32 and thus sealing properties with respect of a seal surface 24a of the opening portion 24 are improved in a closing state of the valve body 32 (see FIG. 2). Further, the air intake control valve 3 is configured that the opening and closing operations of the opening portions 24 corresponding to each of the air intake ports are synchronized with respect to all of the four air intake ports 2a to 2d, by rotating the four valve bodies 32 in the same phase by rotating the shaft 31.

Bearing Structure of Air Intake Control Valve

Hereinafter, the bearing structure of the air intake control valve 3 will be described. As illustrated in FIG. 1, an intermediate holding portion 70 is provided on the intermediate partition wall 11 which separates the adjacent air intake ports (for example, the air intake ports 2a and 2b, or the like) from each other and the end portion holding portion 80 is provided on the end portion partition wall 12 of the outsides (sides not adjacent to the air intake ports 2b and 2c) of the air intake ports 2a and 2d on the both ends. The intermediate bearing member 50 is fitted into the intermediate holding portion 70 and the end portion bearing member 60 is fitted into the end portion holding portion 80. Whether the intermediate bearing member 50 and the end portion bearing member 60 are disposed on the intermediate portions or on the end portion of the forming area of the air intake ports 2a to 2d, outer shapes thereof become different from each other (see FIG. 5 and FIG. 7). However, the intermediate bearing member 50 and the end portion bearing member 60 have functionally a same role.

Figure 4:
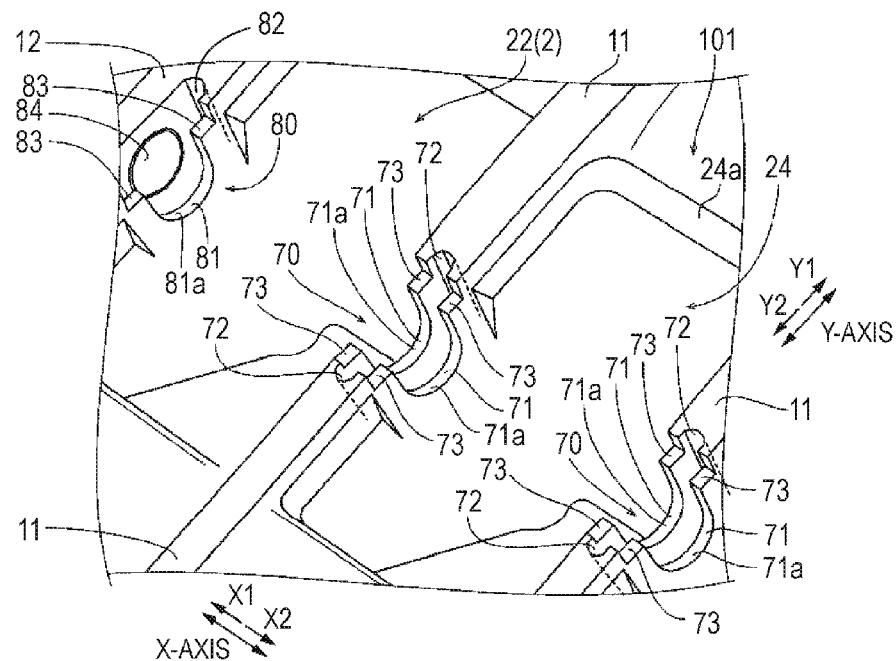
FIG. 4 is a perspective view illustrating inner configuration of an air intake device main body according to the embodiment disclosed here.

As illustrated in FIG. 4, the intermediate holding portion 70 is formed by cutting the intermediate partition wall 11 in a U-shape. In addition, the intermediate holding portion 70 includes a pair of holding portion 71 having a U-shape groove (an example of a concave portion), and a groove portion 72 which is formed between the pair of holding portion 71 (the X-axis direction) and has a predetermined groove depth. A concave portion 73 which has a step shape formed to be lowered one step with respect to a junction surface with the cover member 101b (see FIG. 1) is provided on a Y1 side and a Y2 side, one by one in the upper end portion of an inside surface 71a having a U-shape of each of the pair of holding portion 71. Therefore, the intermediate holding portion 70 has the four concave portions 73. With respect to the following description, in the FIG. 4 to FIG. 11, a direction in which the blade portion 32b extends in a state where the valve body 32 closes the opening portion 24 is substantially referred to as a Y-axis direction.

Figure 5:
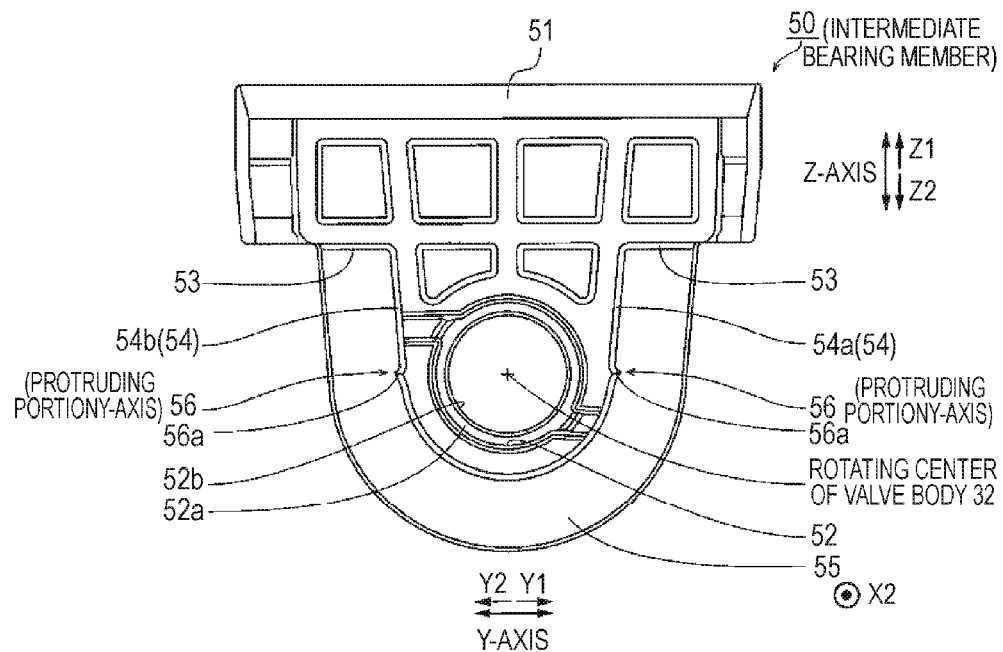
FIG. 5 is a view illustrating a case where an intermediate bearing member is viewed in a rotating shafting direction, according to the embodiment disclosed here.

In addition, the intermediate bearing member 50 made from resin (see FIG. 5) is configured to be inserted (pressed) into the intermediate holding portion 70 (see FIG. 4) formed on the intermediate partition wall 11. As illustrated in FIG. 5, the intermediate bearing member 50 includes a main body portion 51, and a shaft inserting hole 52 into which the shaft 31 and the rotating shaft portion 32c (see FIG. 3) of the valve body 32 are inserted. In addition, the main body portion 51 includes four positioning portions 53 (see FIG. 6) formed on four corners of the upper portion thereof, facing surfaces 54 having a U-shape which continuously extends downwardly from the positioning portions 53, and a seal portion 55 which is provided along the outer periphery of the main body portion 51. In addition, as illustrated in Fig, 6, the shaft inserting hole 52 passes through the main body portion 51 in a plate thickness direction (X-axis direction) in the vicinity of the bottom portion of the main body portion 51. The inside of the shaft inserting hole 52 is formed in a cylindrical shape and is configured to be capable of sliding the rotating shaft portion 32c (see FIG. 3) of the valve body 32.

Figure 9:
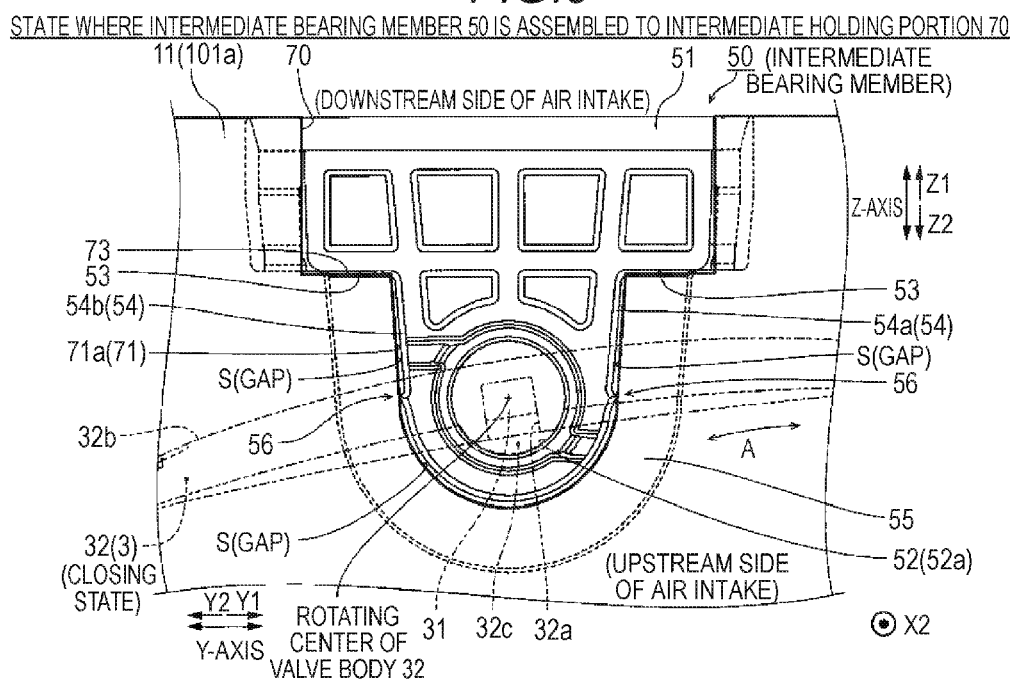
FIG. 9 is a view illustrating a case where the assembled state of the intermediate bearing member to an intermediate holding portion is viewed in the rotating shaft direction, in the air intake device according to the embodiment disclosed here.

As illustrated in FIG. 9, the four positioning portions 53 of the intermediate bearing member 50 are configured to be in contact with the concave portions 73 of the intermediate holding portion 70, in a state where the intermediate bearing member 50 is inserted (pressed) into the intermediate holding portion 70. Accordingly, the intermediate bearing member 50 which is inserted into the intermediate holding portion 70 is restricted from moving in an inserting direction and in an extending direction (the Y-axis direction in FIG. 4) of the intermediate partition wall 11 which is perpendicular to the inserting direction. In addition, the main body portion 51 including the shaft inserting hole 52 becomes a suspended state where the facing surfaces 54 having a U-shape have a gap S of about 0.2 mm with respect to the holding portion 71 (the inside surface 71 a) having a U-shape, by the positioning portion 53 being in contact with the concave portions 73. In addition, in this case, fine gap between a pair of the seal portion 55 and the inside surface of the groove portion 72 is also formed, by the pair of seal portion 55 being pressed into the groove portion 72.

In addition, as illustrated in FIG. 4, the end portion holding portion 80 is formed by the end portion partition wall 12 being cut in a U-shape. In addition, the end portion holding portion 80 includes a holding portion 81 (an example of a concave portion) having a U-shaped groove, and a groove portion 82 which is formed between the holding portion 81 and the end portion partition wall 12 and has a predetermined groove depth. A concave portion 83 which has a step shape formed to be lowered one step with respect to a junction surface with the cover member 101b (see FIG. 1) is provided on the Y1 side and the Y2 side, one by one in the upper end portion of the inside surface 81 a having a U-shape of each of the holding portion 81.

Figure 7:
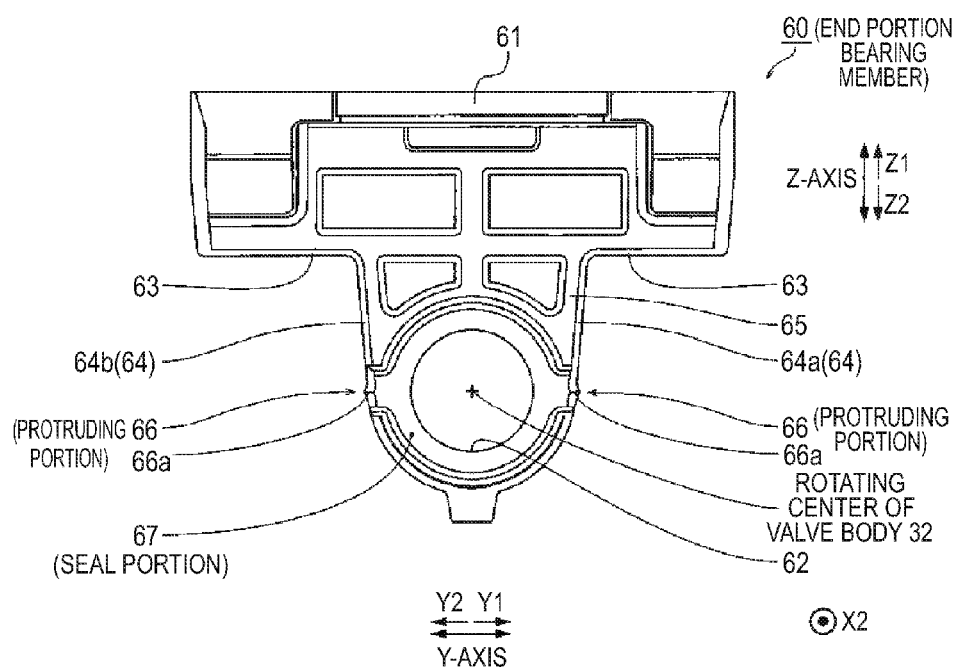
FIG. 7 is a view illustrating a case where an end portion bearing member is viewed in the rotating shaft direction, according to the embodiment disclosed here.
Figure 8:
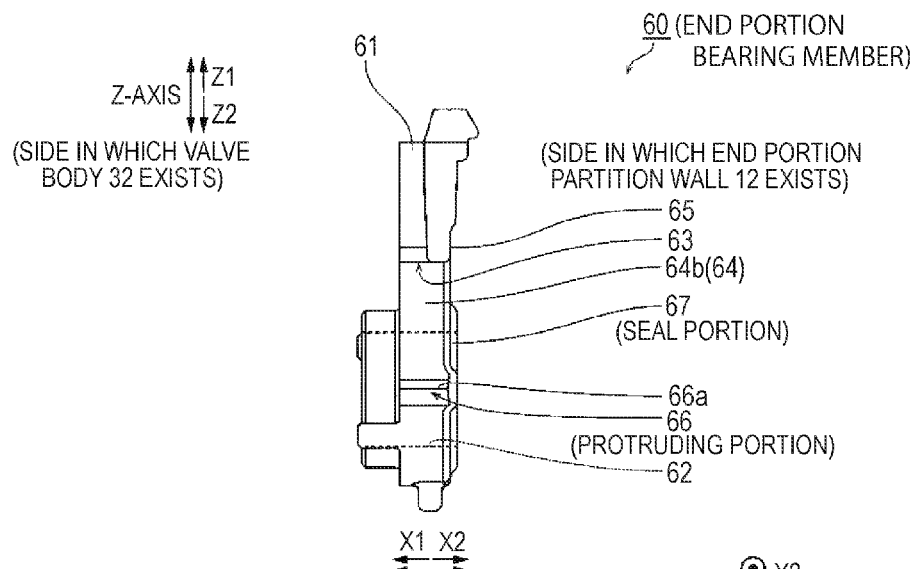
FIG. 8 is a view illustrating a case where the end portion bearing member is viewed in the side direction, according to the embodiment disclosed here.

In addition, the end portion bearing member 60 made from resin (see FIG. 7) is configured to be inserted (pressed) into the end portion holding portion 80 (see FIG. 4) formed on the end portion partition wall 12. As illustrated in FIG. 7, the end portion bearing member 60 includes a main body portion 61, and a shaft inserting hole 62 into which the shaft 31 and the rotating shaft portion 32c of the valve body 32 (see FIG. 3) are inserted. In addition, the main body portion 61 includes two positioning portions 63 (see FIG. 7) formed on each of Y1 side and Y2 side of the upper portion thereof and facing surfaces 64 having a U-shape which continuously extends downwardly from the positioning portion 63. In addition, as illustrated in FIG. 8, the shaft inserting hole 62 passes through the main body portion 61 in the thickness direction (X-axis direction) in the vicinity of the bottom portion of the main body portion 61. The inside surface of the shaft inserting hole 62 is formed in a cylindrical shape and is configured to be capable of sliding the rotating shaft portion 32c (see FIG. 3) of the valve body 32.

Figure 10:
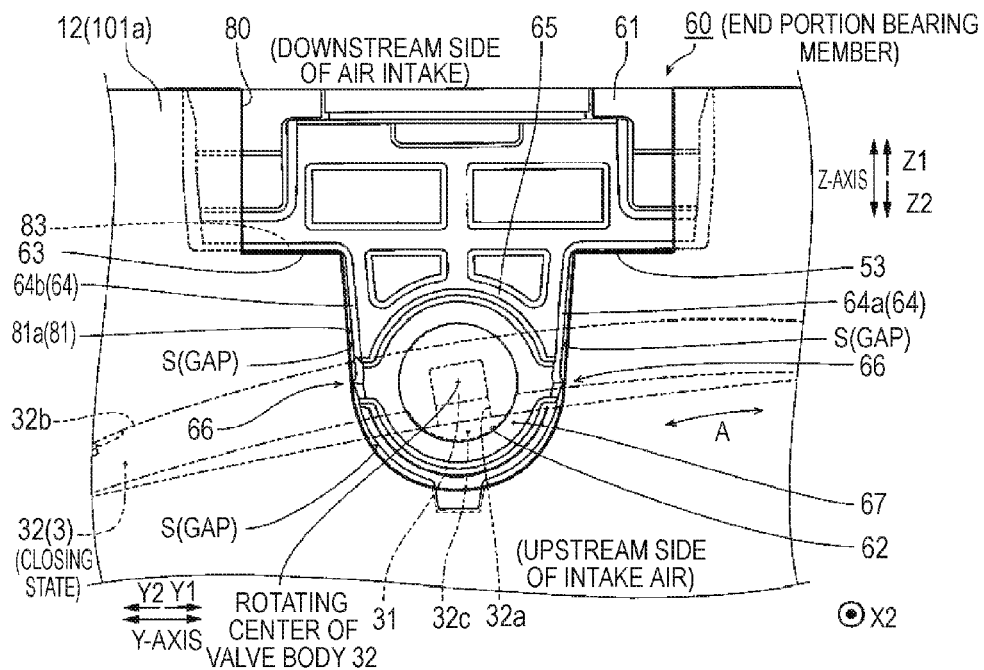
FIG. 10 is a view illustrating a case where the assembled state of the end portion bearing member to an end portion holding portion is viewed in the rotating shaft direction, in the air intake device according to the embodiment disclosed here.

As illustrated in FIG. 10, the two positioning portions 63 of the end portion bearing member 60 are configured to be in contact with the concave portions 83 of the end portion holding portion 80, in a state where the end portion bearing member 60 is inserted (pressed) into the end portion holding portion 80. Accordingly, the end portion bearing member 60 which is inserted into the end portion holding portion 80 is restricted from moving in the inserting direction and in the extending direction (the Y-axis direction in FIG. 4) of the end portion partition wall 12 which is perpendicular to the inserting direction. In addition, the main body portion 61 including the shaft inserting hole 62 becomes a suspended state where the facing surfaces 64 having a U-shape have a gap S of about 0.2 mm with respect to the holding portion 81 (the inside surface 81a) having a U-shape, by the positioning portion 63 being in contact with the concave portions 83.

Figure 6:
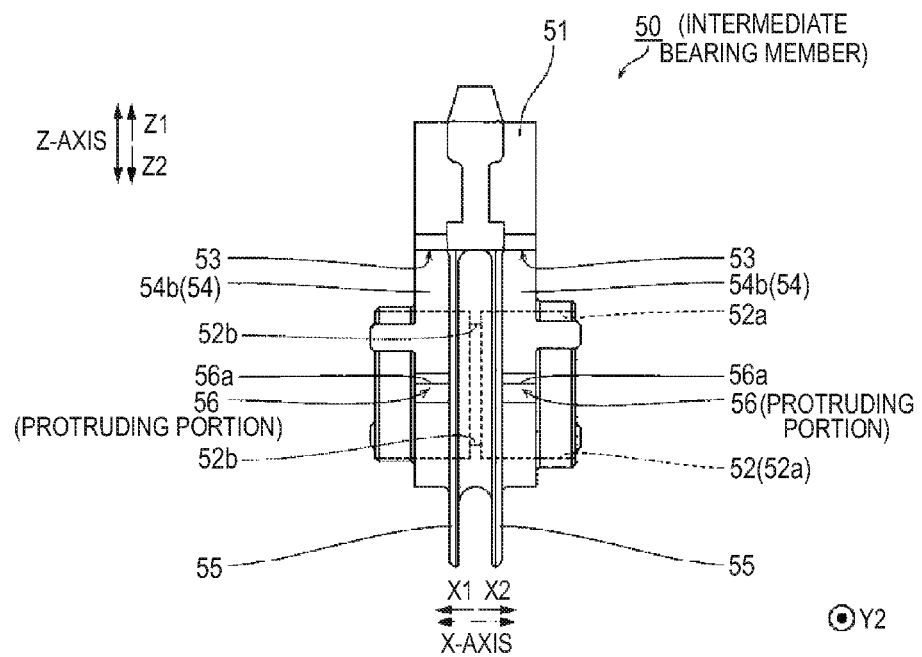
FIG. 6 is a view illustrating a case where the intermediate bearing member is viewed in a side direction, according to the embodiment disclosed here.

Here, in the present embodiment, as illustrated in FIG. 5, a protruding portion 56 is formed on the facing surfaces 54 in the intermediate bearing member 50. The protruding portion 56 protrudes from the facing surfaces 54 toward the inside surface 71a of the intermediate holding portion 70. In this case, the protruding portion 56 has a taper shape in which a width is gradually narrowed toward the tip end portion 56a. In other words, the protruding portion 56 protrudes in an outward radial direction (in the arrow Y1 direction and in the arrow Y2 direction) of the rotating shaft portion 32c (see FIG. 9) about the shaft inserting hole 52. In addition, each of the protruding portions 56 is provided on the facing surface 54a of one side (the Y1 side) and the facing surface 54b of the other side (the Y2 side) in the outward radial direction of the rotating shaft portion 32c (see FIG. 9) about the shaft inserting hole 52. In addition, as illustrated in FIG. 6, the tip end portion 56a of the protruding portion 56 extends parallel in the X-axis direction along which the rotating shaft portion 32c (see FIG. 3) of the valve body 32 extends. Accordingly, as illustrated in FIG. 9, in a state where the intermediate bearing member 50 is inserted (pressed) into the intermediate holding portion 70, the gap S between the facing surface 54a and the inside surface 71a of the holding portion 71 and the gap S between the facing surface 54b and the inside surface 71a are configured to be sealed by each of the protruding portions 56.

In addition, in this case, the protruding portion 56 is manufactured to have a protruding amount (a protruding length from the facing surfaces 54 to the tip end portion 56a) which is equal to or more than the size of the gap S between the inside surface 71a and the facing surfaces 54 (54a and 54b) other than the protruding portion 56 in advance. Furthermore, the protruding portion 56 is manufactured to have a protruding amount which is equal to or more than the sum of dimensional tolerance at the time of manufacture of the main body portion 101a and intermediate bearing member 50 and the size of the gap S between the inside surface 71b and the facing surfaces 54 of the intermediate bearing member 50 other than the protruding portion 56 in advance.

In addition, the configuration similar to the intermediate bearing member 50 is also provided the end portion bearing member 60. In other words, as illustrated in FIG. 7, protruding portions 66 are formed on the facing surfaces 64 in the end portion bearing member 60. The protruding portions 66 also protrude in the outward radial direction (in the arrow Y1 direction and in the arrow Y2 direction) about the shaft inserting hole 62 and are provided on each of the facing surface 64a of the one side (the Y1 side) and the facing surface 64b of the other side (the Y2 side) in the outward radial direction. In addition, the protruding portion 66 has a taper shape in which a width is gradually narrowed toward the tip end portion 66a. In addition, as illustrated in FIG. 8, the tip end portion 66a of the protruding portion 66 extends parallel in the X-axis direction along which the rotating shaft portion 32c (see FIG. 3) of the valve body 32 extends. Accordingly, as illustrated in FIG. 10, in a state where the end portion bearing member 60 is inserted (pressed) into the end portion holding portion 80, a gap S between the facing surface 64a and the inside surface 81a of the holding portion 81 and a gap S between the facing surface 64b and the inside surface 81a are configured to be closed by each of the protruding portions 66.

In this case, the protruding portion 66 is manufactured to have a protruding amount (a protruding length from the facing surface 64 to the tip end portion 66a) which is equal to or more than the size of the gap S between the inside surface 81a and the facing surfaces 64 (64a and 64b) other than the protruding portion 66 in advance. In addition, the protruding amount at the time of manufacturing of the protruding portion 66 is set to be equal to or more than the sum of dimensional tolerance at the time of manufacture of the main body portion 101a and the end portion bearing member 60 and the size of the gap S between the inside surface 81b and the facing surfaces 64 (64a and 64b) of the end portion bearing member 60 other than the protruding portion 66. Accordingly, even if the gap S is maximized due to an assembling error at the time of manufacture of the air intake device main body 101, the protruding portion 56 (66) is provided to have a protruding length by which the gap S is reliably sealed in the intermediate bearing member 50 and the end portion bearing member 60.

In addition, in the present embodiment, as illustrated in FIG. 9, when viewed along the X-axis Direction in which the rotating shaft portion 32c of the valve body 32 extends, the pair of protruding portion 56 is provided on the position overlapped with the blade portion 32b at the time of closing of the valve body 32 (illustrated by a two-dot chain line). In addition, as illustrated in FIG. 10, when viewed along the X-axis direction, the pair of protruding portion 66 is provided on the position overlapped with the blade portion 32b of the valve body 32 at the time of closing of the valve body 32 (illustrated by a two-dot chain line).

Accordingly, the gap S between the facing surfaces 54 (the facing surfaces 64) and the inside surface 71a (the inside surface 81a) of the holding portion 71 (the holding portion 81) is divided (split) into an area of the Z2 side (an area of upstream side of air intake) and an area of the Z1 side (an area of downstream side of air intake) in the Z-axis direction (in an air intake flowing direction), by the pair of protruding portion 56 (protruding portion 66). Therefore, the leak of the air intake from the upstream side of the air intake (the Z2 side in the drawings) to the downstream side thereof (the Z1 side in drawings) through the gap S is inhibited in a state where the valve body 32 closes the opening portion 24 (see FIG. 9 and FIG. 10).

In addition, as illustrated in FIG. 6, each of the protruding portions 56 is provided on one side (X1 side) and the other side (X2 side) in the intermediate partition wall 11 (see FIG. 4) as a boundary in the X-axis direction in which the rotating shaft portion 32c extends. Reading this, as illustrated in FIG. 8, the protruding portion 66 is provided on only one side (the X1 side) in the X-direction in which the rotating shaft portion 32c exists with respect to the end portion partition wall 12 (see FIG. 4).

Figure 11:
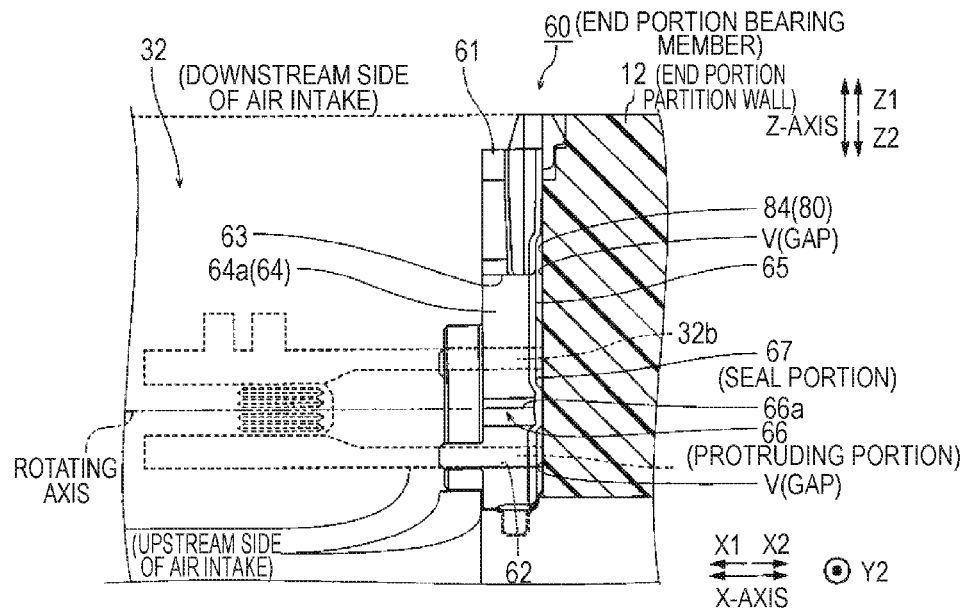
FIG. 11 is a view illustrating a case where the assembled state of the end portion bearing member to the end portion

As illustrated in FIG. 7 and FIG. 8, a seal portion 67 which is formed to continuously extend along the edge portion of the shaft inserting hole 62 in the main body portion 61 from the protruding portion 66 is further included in the end portion bearing member 60. The seal portion 67 is formed in an annular shape along the opening edge portion of the X2 side (front side in FIG. 7) of the shaft inserting hole 62. As illustrated in FIG. 11, in a state where the end portion bearing member 60 is inserted (pressed) into the end portion holding portion 80, the seal portion 67 has a role to close the gap V between a rear surface 65 opposite to a side (the X1 side) in which the valve body 32 is positioned and a wall surface 84 (see FIG. 11) of the end portion holding portion 80. In other words, a gap V which extends between the rear surface 65 of the end portion bearing member 60 and the wall surface 84 of the end portion holding portion 80 in the Z-axis direction (in the air intake flowing direction) is divided (split) into the area of the Z2 side (the area of the upstream side of the air intake) and the area of Z1 side (the area of the downstream side of the air intake) by the seal portion 67 (see FIG. 8) having an annular shape. Therefore, as illustrated in FIG. 11, the leak of the air intake from the upstream side of the air intake (Z2 side in drawings) to the downstream side thereof (Z1 side in drawing) through the gap S as well as the gap V of the rear surface 65 side is inhibited in a state where the valve body 32 closes the opening portion 24 (see FIG. 10).

In the description referred to FIG. 11, the seal structure of the end portion bearing member 60 retaining the rotating shaft portion 32c of X2 side of the valve body 32 which closes the opening portion 24 of the air intake port 2d illustrated in FIG. 3 is described, and the seal structure of the end portion bearing member 60 retaining the rotating shaft portion 32c of X1 side of the valve body 32 which closes the opening portion 24 of the air intake port 2a is also the same as the structure of FIG. 11.

The verification experiment for confirming the effect of the present embodiment was conducted. Specifically, an amount of leakage of air intake from the gap S at the time (the pressing torque is set to about 0.1 Nm) of closing of the valve body 32 in a case where only the protruding portion 66 is provided on the end portion bearing member 60 and an amount of leakage of air intake from the gap S at the time of closing of the valve body 32 in a case where the protruding portion 66 is not provided at all on the end portion bearing member 60 are measured, respectively.

As a result of the verification experiment, the result that the amount of leakage of air intake from the gap S at the time of closing of the valve body 32 in a case where only the protruding portion 66 is provided on the end portion bearing member 60 may be reduced by about 6% with respect to the amount of leakage of air intake from the gap S at the time of closing of the valve body 32 in a case where the protruding portion 66 is not provided at all on the end portion bearing member 60 is obtained.

In addition, as a confirmation experiment for confirming the further effect, an amount of leakage of air intake from the gap S and gap V at the time (the pressing torque is set to about 0.1 Nm) of closing of the valve body 32 in a case where only the protruding portion 66 and the seal portion 67 are provided on the end portion bearing member 60 and an amount of leakage of air intake from the gap S at the time of closing of the valve body 32 in a case where the protruding portion 66 and the seal portion 67 are not provided on the end portion bearing member 60 are measured respectively.

As a result of the verification experiment, the result that the amount of leakage of air intake from the gap S and the gap V at the time of closing of the valve body 32 in a case where the protruding portion 66 and the seal portion 67 are provided on the end portion bearing member 60 may be significantly reduced by about 31% with respect to the amount of leakage of air intake from the gap S at the time of closing of the valve body 32 in a case where the protruding portion 66 and the seal portion 67 are not provided at all on the end portion bearing member 60 is obtained. In other words, in the end portion bearing member 60, by providing the seal portion 67 (see FIG. 8) in addition to the protruding portion 66, it is confirmed that the air intake which separately flows around the rear surface 65 side in the main body portion 61 can be efficiently prevented from being remarkably leaked in the downstream side through the gap V, with respect to the amount of leakage from the gap S of the air intake. Accordingly, it is considered that providing the seal portion 67 on the end portion bearing member 60 in addition to the protruding portion 66 is effective means for significantly improving the sealing properties of the air intake ports 2a and 2d at the time of closing of the valve body 32.

As illustrated in FIG. 3, with respect to the intermediate bearing member 50, since the protruding portions 56 (a total of four in a symmetrical shape in the lateral direction) are provided to divide the stream into the upstream side and the downstream side of air intake at the time of closing of the valve in both sides of the intermediate partition wall 11, for example, even if an air intake is leaked to the air intake port 2a or air intake port 2c adjacent to the air intake port 2b from the air intake port 2b of one side in the upstream side of the valve body 32, in each of the air intake ports 2a and the air intake port 2c of the leaked side, the air intake is unlikely to be leaked in the downstream side of the valve body 32 by the protruding portion 56 of the intermediate bearing member 50. In this respect, that a total of four protruding portions 56 which has a symmetrical shape in the lateral direction are provided on the intermediate bearing member 50 is very useful.

In the intermediate position of the shaft inserting hole 52 in the X-axis direction in the intermediate bearing member 50, as illustrated in FIG. 6, the protruding portion 52b which has a pillar shape and which protrudes in the inside of the shaft inserting hole 52 is formed. Thereby, as illustrated in FIG. 3, in the shaft inserting hole 52 of the intermediate bearing member 50 which is provided between the air intake ports 2b and 2c which are adjacent to each other, the air intake passing through the gap between the inside surface 52a of the shaft inserting hole 52 from the air intake port 2b side and the rotating shaft portion 32c of the valve body 32 bypasses the protruding portion 52b, passes through the gap between the inside surface 52a of the shaft inserting hole 52 of the air intake port 2c and the rotating shaft portion 32c of the valve body 32, and then flows to the air intake port 2c. In other words, the inside surface 52a of the intermediate bearing member 50, the rotating shaft portion 32c of the valve body 32, and the protruding portion 52b constitute a labyrinth seal. The air intake device 100 of the present embodiment is configured as described above.

Effect of Embodiment

In the present embodiment, it is possible to obtain the following effects.

In the present embodiment, as described above, the facing surfaces 54 which extend from the positioning portion 53 along the holding portion 71 of the air intake ports 2b and 2c and face each other in an inward radial direction of the rotating shaft portion 32c with respect to the holding portion 71 of the air intake ports 2b and 2c, with a gap S therebetween and protruding portions 56 which protrude toward the holding portion 71 of the air intake ports 2b and 2c from the facing surfaces 54 and thus seals the gap S are provided on the intermediate bearing member 50. Thereby, even if the rotating shaft portion 32c of the valve body 32 is supported by using the intermediate bearing member 50 which has the gap S and disposed on the holding portion 71 of the air intake ports 2b and 2c, the gap S (the gap S between the holding portion 71 of the air intake ports 2b and 2c and the intermediate bearing member 50) around the intermediate bearing member 50 can be sealed by the protruding portion 56 protruding from the facing surfaces 54 of the intermediate bearing member 50 toward the holding portion 71 of the air intake ports 2a to 2d. In addition, in the end portion bearing member 60, the facing surfaces 64 which extend from the positioning portion 63 along the holding portion 81 of the air intake ports 2a and 2d and face each other in the inward radial direction of the rotating shaft portion 32c with respect to the holding portion 81 of the air intake ports 2a and 2d, with a gap S therebetween, and the protruding portions 66 which protrude toward the holding portion 81 of the air intake ports 2a and 2d from the facing surfaces 64 and thus seal the gap S are provided. Thereby, even if the rotating shaft portion 32c of the valve body 32 is supported by using the end portion bearing member 60 which has the gap S and disposed on the holding portion 81 of the air intake ports 2a and 2*d*, the gap S (the gap S between the holding portion 81 of the air intake ports 2*a* and 2*d* and the end portion bearing member 60) around the end portion bearing member 60 can be sealed by the protruding portion 66 protruding from the facing surfaces 64 of the end portion bearing member 60 toward the holding portion 81 of the air intake ports 2*a* and 2*d*.

Accordingly, in the preset embodiment, even if the valve body 32 is fully closed, the leakage of air (air intake) through the gap S around the intermediate bearing member 50 from the upstream side to the downstream side of the air intake ports 2*b* and 2*c* can be inhibited and the leakage of air through the gap S around the end portion bearing member 60 from the upstream side to the downstream side of the air intake ports 2*a* and 2*d* can be inhibited. In other words, since sealing properties of the air intake ports 2*a* to 2*d* can be improved, air intake pulsation (air intake inertia effect) may be efficiently obtained and the engine performance can be improved.

In addition, in the present embodiment, each of the protruding portion 56 of the intermediate bearing member 50 is provided on one side and the other side in the outward radial direction of the rotating shaft portion 32*c* about the rotating shaft portion 32*c,* and the protruding portions 66 of the end portion bearing member 60 are provided respectively. Accordingly, since a pair of protruding portion 56 (the protruding portions 66) of the intermediate bearing member 50 (the end portion bearing member 60) is provided on the both sides about the rotating shaft portion 32*c,* air (air intake) can be efficiently inhibited from being leaked from the upstream side to the downstream of the air intake ports 2*a* to 2*d* through two paths (two paths (the gap S) in the clockwise direction and in the counterclockwise direction) around the intermediate bearing member 50 (the end portion bearing member 60).

In addition, in the present embodiment, when viewed along the direction in which the rotating shaft portion 32*c* of the valve body 32 extends, the protruding portions 56 of the intermediate bearing member 50 and the protruding portions 66 of the end portion bearing member 60 are provided on the position overlapping with the valve body 32 at the time of closing of the valve body 32. In a case where the valve body 32 is fully closed, air (air intake) can be reliably inhibited from being leaked from the upstream side to the downstream side of the air intake ports 2*a* to 2*d* through two paths (two paths (the gap S) in the clockwise direction and in the counterclockwise direction) around the intermediate bearing member 50 (the end portion bearing member 60). In other words, in a case where the valve body 32 is fully closed, the sealing properties of the air intake ports 2*a* to 2*d* can be reliably obtained.

In addition, in the present embodiment, the protruding portion 56 is configured to have the protruding amount which is equal to or more than the gap S between the inside surface 71*b* of the holding portion 71 of the main body portion 101*a* (the air intake ports 2*b* and 2*c*) and the facing surfaces 54 of the intermediate bearing member 50 other than the protruding portion 56. In addition, the protruding portion 66 is configured to have the protruding amount which is equal to or more than the gap S between the inside surface 81*b* of the holding portion 81 of the main body portion 101*a* (the air intake ports 2*a* and 2*d*) and the facing surfaces 64 of the end portion bearing member 60 other than the protruding portion 66. Accordingly, since the gap S around the intermediate bearing member 50 (the end portion bearing member 60) is reliably closed by the protruding portion 56 (66) having a sufficient protruding amount, air (air intake) can be reliably inhibited from being leaked from the upstream side to the downstream of the air intake ports 2*a* to 2*d* through the gaps S around the intermediate bearing member 50 (the end portion bearing member 60) other than the valve body 32, regardless of the opening and closing state of the valve body 32.

In addition, in this disclosure, each of the protruding portions 56 (66) of the intermediate bearing member 50 (the end portion bearing portion 60) is provided on one side and the other side in the intermediate partition wall 11 of the main body portion 101*a* as a boundary in which the rotating shaft portion 32*c* extends. Accordingly, even if the valve body 32 is incorporated into each of air intake ports 2*a* to 2*d* and the four valve bodies 32 are linked to constitute the air intake device 100, air (air intake) can be inhibited from being leaked from the upstream side to the downstream of each of air intake ports 2*a* to 2*d* through the gaps S around the intermediate bearing member 50 (the end portion bearing member 60), when the valve body 32 is closed. Accordingly, the air intake device 100 reliably having the air intake inertia effect (inertia supercharging effect) can be obtained.

In addition, in the preset embodiment, the protruding portion 56 (the protruding portion 66) of the intermediate bearing member 50 (the end portion bearing portion 60) is provided in order to extend in parallel in the X-axis direction in which the rotating shaft portion 32*c* of the valve body 32 extends. Accordingly, the gap S between the facing surfaces 54 (64) and the inside surface 71*a* (81*a*) of the holding portion 71 (81) can be reliably divided in the Z-axis direction (in the air intake flowing direction) perpendicular to the X-axis direction. Accordingly, even if the valve body 32 is fully closed, air can be reliably inhibited from being leaked from the upstream side to the downstream side of the air intake ports 2*a* to 2*d* through the gap S around the intermediate bearing member 50 (the end portion bearing member 60).

In addition, in the present embodiment, the protruding portion 56 (the protruding portion 66) of the intermediate bearing member 50 (the end portion bearing member 60) is formed in order to have a taper shape in which the a width thereof gradually narrowed toward a tip end thereof. Accordingly, in a state where the intermediate bearing member 50 (the end portion bearing member 60) are inserted (pressed) into the intermediate holding portion 70 (the end portion holding portion 80), the protruding portion 56 (the protruding 66) is in contact with the inside surface 71*a* (81*a*) of the holding portion 71 (81) with the minimum contact area required. Therefore, as compared with the case where the entirety of the facing surfaces 54 (64) is in contact with the inside surface 71*a* (81*a*), the deformation of shape of the shaft inserting hole 52 (the shaft inserting hole 62) can be minimized.

In addition, in the present embodiment, the end portion bearing member 60 which rotatably supports the rotating shaft portion 32*c* of the valve body 32 which opens and closes each of the air intake ports 2*a* and 2*d* corresponding to the end portion of the shaft 31 from the end portion side is provided. Then, the seal portion 67 which closes the gap V between the rear surface 65 on the opposite to the valve body 32 of the end portion bearing member 60 and the wall surface 84 of end portion holding portion 80 of the air intake ports 2*a* and 2*d* is provided on the end portion bearing member 60, in addition to the protruding portion 66. Accordingly, in addition to closing of the gap S between the inside surface 81*a* of the holding portion 81 and the facing surfaces 64, the leakage of air from the upstream side of air intake through the gap V of the rear surface 65 of the end portion bearing member 60 can be inhibited. As a result, even if the valve body 32 is fully closed in the air intake ports 2a and 2d corresponding to the end portion of the shaft 31, air (air intake) can be reliably inhibited from being leaked from the upstream side to the downstream side of the air intake ports 2a and 2d through the gap S and gap V around the end portion bearing member 60.

In addition, in the present embodiment, the protruding portion 56 (66) is configured to have the protruding amount which is equal to or more than the sum of dimensional tolerance at the time of manufacture of the main body portion 101a and the intermediate bearing member 50 (the end portion bearing member 60) and the gap S between the inside surface 71b (81b) and the facing surfaces 54 (64) of the intermediate bearing member 50 (the end portion bearing member 60) other than the protruding portion 56 (66). Accordingly, even if the gap S is maximized due to an assembling error at the time of manufacture, protruding portion 56 (66) having a protruding amount by which the gap S is reliably sealed can be easily provided in the intermediate bearing member 50 (the end portion bearing member 60).

Modified Example

The embodiment disclosed here should be considered to be illustrative and not to be restrictive in all respects. The scope of this disclosure is defined by the appended claims rather than by the description of the above embodiments and further includes all modifications (a modified example) within meaning and scope equivalent to the scope of the appended claims.

For example, in the embodiment described above, the air intake device disclosed here is applied to the in-line four-cylinder engine for a vehicle. However, the present disclosure is not limited to this. The air intake device disclosed here may be applied to an internal combustion engine other than the engine for a vehicle, and may be applied to an internal combustion engine other than the in-line four-cylinder engine.

In addition, in the embodiment described above, the air intake control valve disclosed here is applied to the air intake control valve for the variable air intake in which the air intake path length changes. However, this disclosure is not limited to this. The air intake control valve disclosed here may be applied to other than the air intake control valve for variable air intake such as a tumble control valve (TCV) generating longitudinal vortex and a swirl control valve (SCV) generating transversal vortex.

In addition, in the embodiment described above, the intermediate bearing member 50 and the end portion bearing member 60 are made of resin. However, this disclosure is not limited to this. "The bearing member" may be formed by rubber material rather than a resin.

In addition, in the embodiment described above, the protruding portion 56 (the protruding portion 66) of the intermediate bearing member 50 (the end portion bearing member 60) is formed in order to extend in parallel in the X-axis direction in which the shaft inserting portion 32a extends. However, this disclosure is not limited to this. If the protruding portion 56 (the protruding portion 66) is protruded from the facing surfaces 54 (64) toward the holding portion 71 (81) of the intermediate holding portion 70 (the end portion holding portion 80) and thus seals the gap S, the protruding portion 56 (the protruding portion 66) may be configured to extend in a direction inclined slightly with respect to the X-axis direction.

In addition, in the embodiment described above, the pair of protruding portion 56 (the protruding portion 66) is provided on one side and the other side of the facing surfaces 54 (the facing surfaces 64) of the intermediate bearing member 50 (the end portion bearing member 60) about the rotating shaft portion 32c. However, this disclosure is not limited to this. For example, two sets of protruding portions 56 (protruding portions 66) may be provided on the one side and the other side about the rotating shaft portion 32c.

In addition, in the embodiment described above, the seal portion 67 is formed in an annular shape along the opening edge portion of X2 side (the front side in FIG. 7) of the shaft inserting hole 62. However, this disclosure is not limited to this. In other words, if the gap V between the rear surface 65 and the wall surface 84 of the end portion holding portion 80 may be divided in the Z-axis direction (in the air intake flowing direction), the seal portion 67 may not be formed in an annular shape.

In addition, in the embodiment described above, the protruding portion 56 of the intermediate bearing member 50 and the protruding portion 66 of the end portion bearing member 60 are provided on the position overlapping with the blade portion 32b of the valve body 32 at the time of closing of the valve body 32. However, this disclosure is not limited to this. In other words, the intermediate bearing member 50 and the end portion bearing member 60 may be configured respectively to provide the protruding portions 56 and 66 on a side close to the upstream side (the Z2 side in FIG. 9) of air intake than the blade portion 32b without overlapping with the blade portion 32b at the time of closing of the valve body 32.

An air intake device according to an aspect of this disclosure includes a valve body which includes a rotating shaft, a bearing member which rotatably supports the rotating shaft of the valve body, and an air intake port which includes concave portions on which the bearing member is disposed. The bearing members includes a positioning portion for positioning the bearing member with respect to the concave portion of the air intake port, facing surfaces which extend from the positioning portion along the concave portion of the air intake port and face each other in an inward radial direction of the rotating shaft with respect to the concave portion, with a gap therebetween, and protruding portions which protrude toward the concave portion of the air intake port from the facing surfaces and seal the gap.

In the first aspect of this disclosure, the air take device includes the facing surfaces which face to extend from the positioning portion along the concave portions of the air intake ports and face each other in the inward radial direction of the rotating shaft with respect to the concave portions of the air intake ports, and the protruding portions which protrude toward the concave portions of the air intake ports from the facing surfaces and seal the gap, on the bearing members. Thereby, even if the rotating shaft of the valve body having the gap is supported by using the bearing members disposed on the concave portions of the air intake ports, the gap (the gap between the concave portions of the air intake ports and the bearing members) around the bearing members can be closed by the protruding portions protruding from the facing surfaces of the bearing members toward the concave portions of the air intake ports. Accordingly, even if the valve body is fully closed, air (air intake) can be inhibited from leaking from the upstream side to the downstream side of the air intake ports through the gap around the bearing members. In other words, since sealing properties of the air intake ports can be improved, air intake pulsation (air intake inertia effect) can be efficiently obtained and the engine performance can be improved.

In the air intake device according to the first aspect of this disclosure, it is preferable that the protruding portions of the bearing member are provided on each of one side and the other side in an outward radial direction of the rotating shaft about the rotating shaft.

According to this configuration, since a pair of the protruding portion of the bearing members is provided on both sides of the rotating shaft as a center, air can be efficiently inhibited from being leaked from the upstream side to the downstream of the air intake ports through two paths (two paths in the clockwise direction and in the counterclockwise direction) around the bearing members.

In the air intake device according to the first aspect of this disclosure, it is preferable that the protruding portions of the bearing member are provided on a position overlapped with the valve body at the time of closing the valve body, in a case where viewed along a direction in which the rotating shaft of the valve body extends.

According to this configuration, in a case where the valve body is fully closed, air (air intake) can be reliably inhibited from being leaked from the upstream side to the downstream of the air intake ports through two paths (two paths in the clockwise direction and in the counterclockwise direction) around the bearing members. In other words, in a case where the valve body is fully closed, the sealing properties of the air intake ports can be reliably obtained.

In the air intake device according to the first aspect of this disclosure, it is preferable that the protruding portion of the bearing members has a protruding amount which is equal to or more than gap interval between an inside surface of the concave portion of the air intake port and facing surfaces of the bearing member other than the protruding portion.

According to this configuration, since the gap around the bearing members is reliably sealed by the protruding portion having a sufficient protruding amount, air can be reliably inhibited from being leaked from the upstream side to the downstream side of the air intake ports through the gaps around the bearing members other than the valve body, regardless of the opening and closing state of the valve body.

In the air intake device according to the first aspect of this disclosure, it is preferable that a plurality of the air intake ports are disposed to be adjacent to each other with the partition wall interposed therebetween and the protruding portions of the bearing member are provided on each of one side and the other side in the partition wall as a boundary in a direction in which the rotating shaft extends.

According to this configuration, even if the air intake device is configured such that the valve bodies are incorporated into each of the plurality of air intake ports and the valve bodies are linked, air can be inhibited from being leaked from the upstream side to the downstream of each of the air intake ports through the gaps around the bearing members, at the time of closing the valve body. Accordingly, the air intake device reliably having the air intake inertia effect (inertia supercharging effect) can be obtained.

An air intake control valve according to a second aspect of this disclosure includes a valve body which includes a rotating shaft, and a bearing member which rotatably supports the rotating shaft of the valve body. The bearing member includes a positioning portion for positioning the bearing member with respect to a concave portion of an air intake port, facing surfaces which extend from the positioning portion along the concave portion of the air intake port and face each other in an inward radial direction of the rotating shaft with respect to the concave portion, with a gap therebetween, and protruding portions which protrude toward the concave portion of the air intake port from the facing surfaces and seal the gap.

In the air intake control valve in the second aspect of this disclosure, the air intake control valve is configured such that even if the rotating shaft of the valve body having the gap is supported by using the bearing members disposed on the concave portions of the air intake ports, the gap (the gap between the concave portions of the air intake ports and the bearing members) around the bearing members can be sealed by the protruding portion protruding from the facing surfaces of the bearing members toward the concave portions of the air intake ports. Accordingly, even if the valve body is fully closed, air (air intake) can be inhibited from being leaked from the upstream side to the downstream side of the air intake ports through the gap around the bearing members. In other words, since sealing properties of the air intake ports can be improved, the air intake device in which air intake pulsation (air intake inertia effect) can be efficiently obtained and the engine performance can be improved may be obtained.

In the air intake device according to the first aspect, the following configurations also will be considered.

Additional Item 1

In the air intake device according to the first aspect, the protruding portion of the bearing members extends along a direction in which the rotating shaft of the valve body extends.

Additional Item 2

In the air intake device according to the first aspect, the protruding portion of the bearing member has a taper shape in which a width is gradually narrowed toward a tip end thereof.

Additional Item 3

In the air intake device in which the plurality of air intake ports are disposed to be adjacent to each other with the partition wall interposed therebetween, the bearing members include an end portion bearing member by which the rotating shaft of the valve body which opens and closes the air intake port corresponding to an end portion among the plurality of air intake ports is rotatably supported from the end portion side, and the end portion bearing member further includes seal portion which seals the gap between the concave portion of the air intake port and a rear surface opposite to the valve body of the end portion bearing member in addition to the protruding portion.

Additional Item 4

In the air intake device in which the protruding portion has a protruding amount which is equal to or more than gap interval between an inside surface of the concave portion of the air intake port and the facing surfaces of the bearing member other than the protruding portion, the air intake port and the bearing member are made from resin and the protruding portion of the bearing member has the protruding amount which is equal to or more than sum of dimensional tolerance at the time of manufacture of the air intake port and the bearing member and the gap interval between the inside surface of the concave portion of the air intake port and the facing surfaces of the bearing member other than the protruding portion.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An air intake device comprising: a valve body which includes a rotating shaft; a bearing member which rotatably supports the rotating shaft of the valve body; and an air intake port which includes a concave portion on which the bearing member is disposed, wherein the bearing member includes a positioning portion for positioning the bearing member with respect to the concave portion of the air intake port, a plurality of facing surfaces which extend from the positioning portion along the concave portion of the air intake port, said facing surfaces facing the concave portion of the air intake port, and a plurality of protruding portions which protrude toward the concave portion of the air intake port from the facing surfaces and seal a gap, said gap existing between the facing surfaces and the concave portion except at the protruding portions, and wherein the protruding portions of the bearing member, in a view along a direction in which the rotating shaft of the valve body extends, are provided at a position overlapping the valve body at the time of closing the valve body.

2. The air intake device according to claim 1,
wherein the protruding portions of the bearing member are provided on each of one side and the other side in an outward radial direction of the rotating shaft about the rotating shaft.

3. The air intake device according to claim 1,
wherein the protruding portion of the bearing member has a protruding amount which is equal to or more than gap interval between an inside surface of the concave portion of the air intake port and facing surfaces of the bearing member other than the protruding portion.

4. The air intake device according to claim 1,
wherein a plurality of the air intake ports are disposed to be adjacent to each other with a partition wall interposed therebetween, and
wherein the protruding portions of the bearing member are provided on one side and the other side in the partition wall as a boundary in a direction in which the rotating shaft extends.

5. The air intake device according claim 1,
wherein the protruding portion of the bearing members extends along a direction in which the rotating shaft of the valve body extends.

6. The air intake device according to claim 1,
wherein the protruding portion of the bearing member has a taper shape in which a width is gradually narrowed toward a tip end thereof.

7. The air intake device according to claim 1,
wherein the plurality of air intake ports are disposed to be adjacent to each other with the partition wall interposed therebetween,
wherein the bearing member includes an end portion bearing member by which the rotating shaft of the valve body which opens and closes the air intake port corresponding to an end portion among the plurality of air intake ports is rotatably supported from the end portion side, and
wherein the end portion bearing member further includes a seal portion which seals the gap between the concave portion of the air intake port and a rear surface opposite to the valve body of the end portion bearing member in addition to the protruding portion.

8. The air intake device according to claim 1,
wherein the protruding portion has a protruding amount which is equal to or more than gap interval between an inside surface of the concave portion of the air intake port and the facing surfaces of the bearing member other than the protruding portion,
wherein the air intake port and the bearing member are made from resin, and
wherein the protruding portion of the bearing member has the protruding amount which is equal to or more than sum of a predetermined tolerance of the air intake port and the bearing member and the gap interval between the inside surface of the concave portion of the air intake port and the facing surfaces of the bearing member other than the protruding portion.

* * * * *